G. JACOBS.
FILING APPLIANCE.
APPLICATION FILED JAN. 31, 1916.

1,214,681.

Patented Feb. 6, 1917.
3 SHEETS—SHEET 2.

Witness:
Ernest A. Crocker

Inventor:
George Jacobs
By Harry F. Ease
Attorney

G. JACOBS.
FILING APPLIANCE.
APPLICATION FILED JAN. 31, 1916.
1,214,681.
Patented Feb. 6, 1917.
3 SHEETS—SHEET 3.
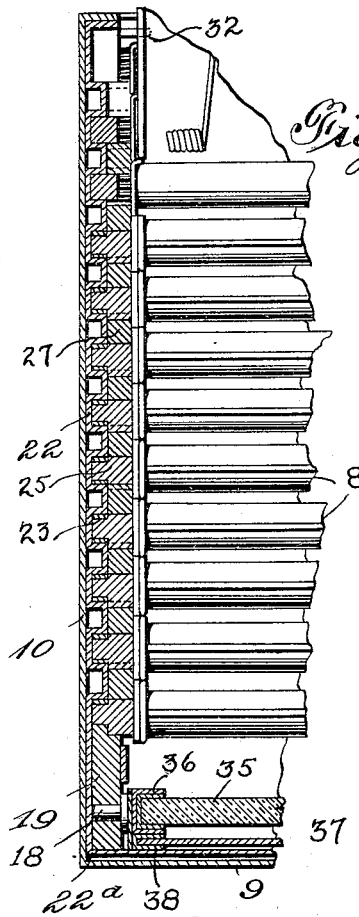
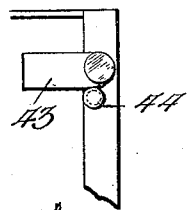
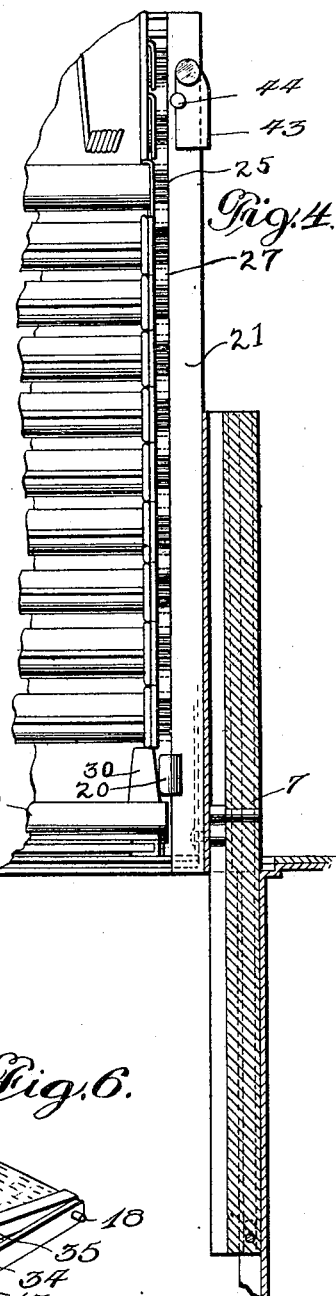
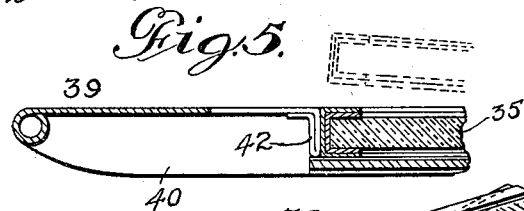
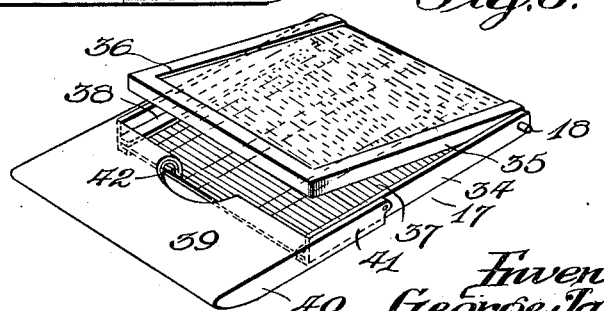
Inventor:
George Jacobs
By Harry Frease
Attorney.
Witness:
Ernest C. Crocker

UNITED STATES PATENT OFFICE.

GEORGE JACOBS, OF ROSWELL, NEW MEXICO, ASSIGNOR TO THE McCASKEY REGISTER COMPANY, (INCORPORATED IN 1914,) OF ALLIANCE, OHIO, A CORPORATION OF OHIO.

FILING APPLIANCE.

1,214,681. Specification of Letters Patent. Patented Feb. 6, 1917.

Original application filed February 21, 1911, Serial No. 609,973. Renewed January 25, 1916, Serial No. 74,276. Divided and this application filed January 31, 1916. Serial No. 75,240.

*To all whom it may concern:*

Be it known that I, GEORGE JACOBS, a citizen of the United States, residing at Roswell, in the county of Chaves and State of New Mexico, have invented certain new and useful Improvements in Filing Appliances, of which the following is a specification.

The invention relates to improvements in filing appliances adapted for the filing of papers, sales slips, bills, memoranda and the like, in classified order, of the type shown in my copending application, Serial No. 609,973, filed February 21, 1911, of which this application is a division; and among other objects, the invention is designed to provide improved means for supporting the filing leaves and for causing relative movement between the pivots of one leaf and the pivots of adjoining leaves, thus permitting the leaves to arrange themselves in stepped relationship when moved into one position, and in superposed or compact relationship when operated into the other position and ready to be telescoped into the elevator for lowering into the casing which is the subject-matter of said parent application.

For the purpose of illustration I have, in the accompanying drawings, shown and herein described one form of filing appliance embodying my invention.

Figure 1:
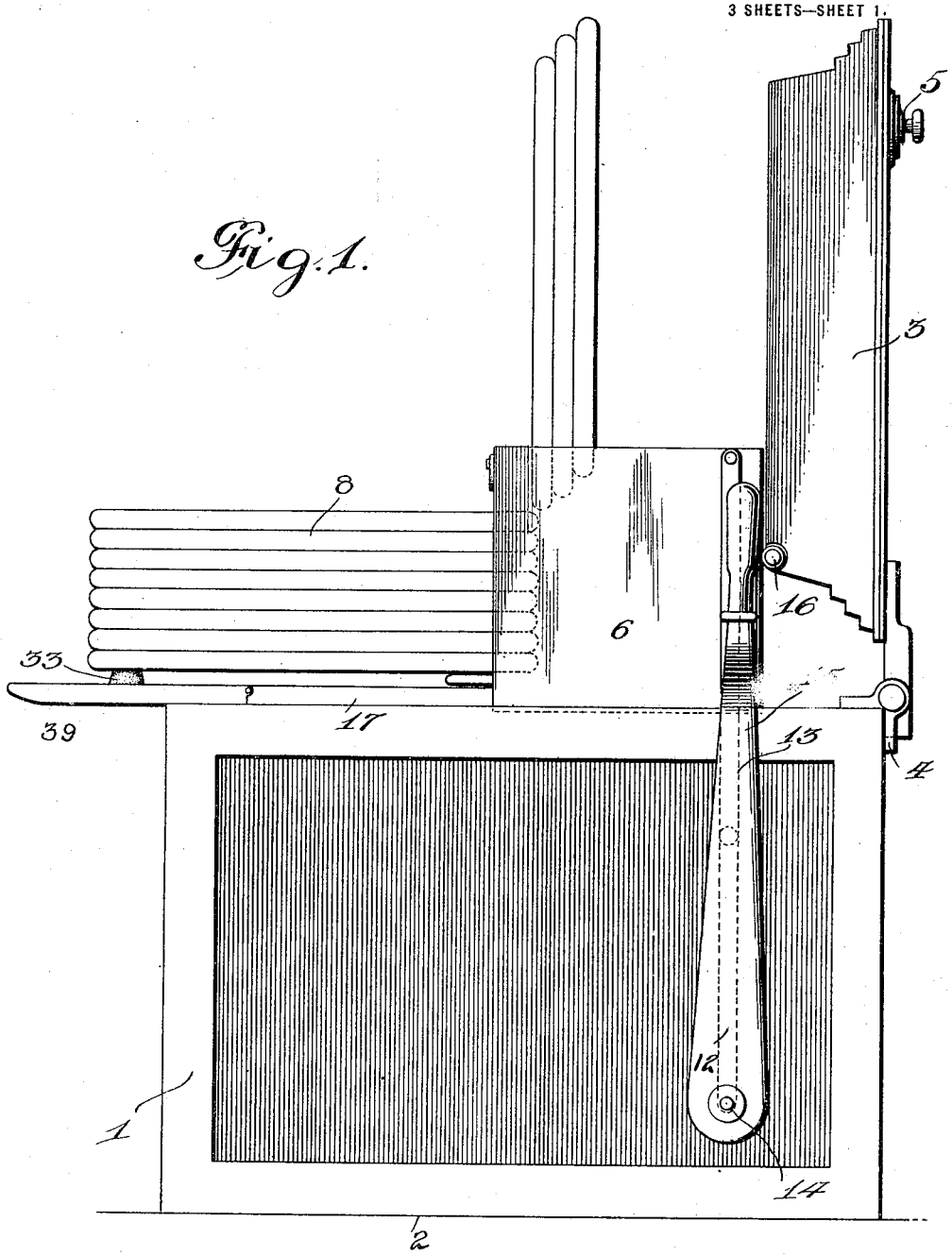
Figure 2:
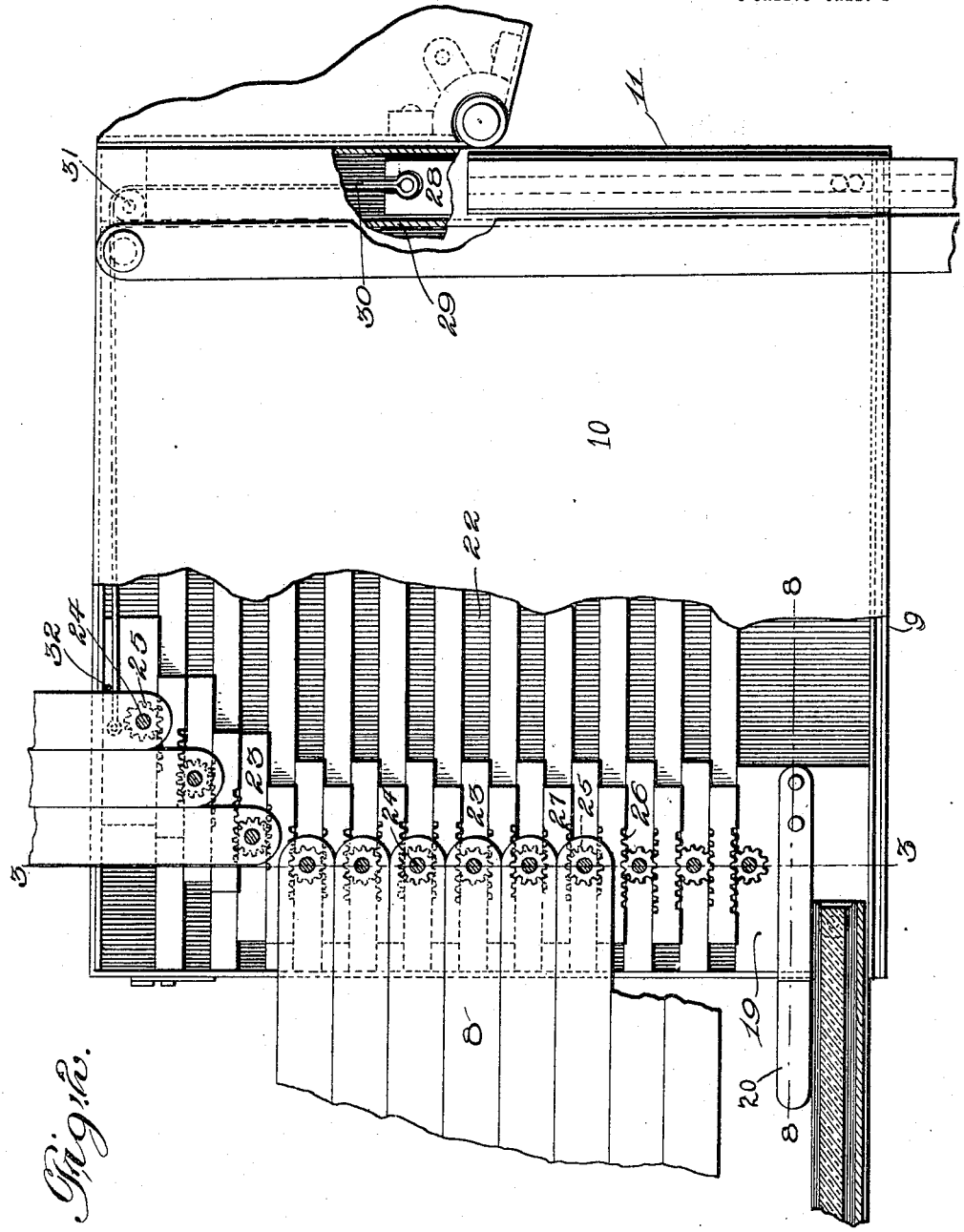

In the drawings Figure 1 is a side elevation of a filing appliance embodying my invention, showing the filing leaves elevated to operative position; Fig. 2, a fragmentary longitudinal vertical section with parts broken away; Fig. 3, a sectional view on line 3—3 of Fig. 2; Fig. 4, a fragmentary front view of the filing leaves showing the guide mechanism thereof in section; Fig. 5, a vertical section through a portion of the base for the leaves and the writing board; Fig. 6, a perspective view of the base and hand rest detached; Fig. 7, a detailed view of the base locking device; and Fig. 8, a section on line 8—8 of Fig. 2.

In the drawings I have shown a casing or housing preferably formed of fireproof material, which may form part of and be made integrally with a safe or vault adapted for holding various records and articles in addition to the slip or bill holding leaves hereinafter described. The form of casing illustrated, preferably comprises sides 1 and a bottom 2, it being open at the top.

3 indicates a door or cover hinged along one edge for closing the top of the casing or housing, a stop 4 being provided on the rear or hinged edge of the door to limit the rearward movement thereof, and preferably arranged to stop the door at the vertical position. Preferably the door is provided with a combination lock 5, as is customary in fire and burglar proof casings or safes.

6 indicates an elevator frame movable vertically in slides 7 movable in guide-ways in the sides of the case and adapted to support a series of pivotally mounted filing leaves 8, said elevator frame preferably being formed of sheet metal and comprising a bottom 9, side walls 10, and a rear wall 11, being open at the front and top to permit the operation of the leaves from a horizontal to a vertical position and vice versa. The elevator 6 is operated by means of a pair of links 12 and 13 actuated by a rock shaft 14 which in turn is manually rocked by a lever 15.

The door 3 is preferably opened and closed by the raising and lowering of the elevator 6 through the manipulation of the lever 15, an anti-friction roller 16 being provided on the lower inner edge of the door, adapted to engage with the rear edge of the elevator to facilitate the swinging of the door.

Means are preferably provided for supporting the leaves so that they will be in stepped relationship when arranged in position for operation, but will permit them to move longitudinally relative to each other into a compact stack of rectangular shape, whereby they may be inclosed within the casing. This construction adapts the leaves for a casing of minimum size and convenient shape. Of these means, 17 indicates a base preferably connected by pivot pins or studs 18, to a pair of blocks 19, slidably mounted in opposite sides of the casing. The operative position of the blocks 19 is at the forward end of the elevator 6 with the base 17 extended and they may be held in such position by spring catches 20, one carried by each block and engaging with flanges 21 at the front end of the elevator. However, by releasing the catches 20, the blocks 19 may be moved rearwardly, for a purpose to be later described.

22 indicates a series of guides arranged at each side of the leaves and extending from front to rear of the elevator 6 each of said series of guides being preferably formed from a single sheet metal plate corrugated at opposite sides as shown in Fig. 3, and then bent on the line 22$^a$, to form a central portion which lies flat on the bottom 9 of the elevator.

As the leaf supporting and operating mechanism is the same on each side of the leaves only one such mechanism need be referred to herein.

23 indicates a series of bearing blocks one for each of the leaves 8 (except the front leaf), adapted to slide in an adjacent guide 22, said blocks being provided with suitable bearings to receive the pivot pin 24 of the leaf, whereby the latter is pivotally supported; the pivot pin of the front leaf being mounted in a suitable bearing in the block 19, which, during the normal operation of the leaves, is stationary. Each of the pivot pins 24 is provided with a gear or pinion 25 adapted to mesh with racks 26 formed on the upper and lower surfaces of a series of slide blocks 27, slidably mounted between the opposing faces of adjoining bearing blocks 23 and arranged between the ribs which form the guides 22 and the near or adjacent side edges of the leaf 8, the gear 25 meshing with the racks 26 of the blocks below and above. This construction connects all the bearing blocks and slide blocks together, first to cause synchronous movement thereof forwardly or rearwardly, and second to cause relative movement between one bearing block and the adjacent slide blocks, when one of the leaves 8 supported by one of the bearing blocks is swung from one position to another. This operation may be clearly illustrated by reference to Fig. 2. Suppose that it is desired to raise the uppermost horizontal leaf to a vertical position. The swinging of the leaf from a horizontal position to the vertical position, will by means of the gear 25 meshing with the rack 26 of the block below, move the adjacent bearing block 23 and the leaf 8 supported thereby rearward a distance equal to half the thickness of the leaf. At the same time the slide block 27 above said bearing block 23, will by means of the gear 25, meshing with the rack 26, be moved rearward an equal distance plus the movement which was imparted to the bearing block 23, or a distance equal to twice the rearward movement of the said block 23. As the bearing blocks and slide blocks for the leaves 8 above the one operated are rigid relative to each other, all the leaves above the one operated will move rearward with the slide block (which is immediately above the bearing block of the operated leaf), as a unit, and to the same extent. This operation takes place each time a leaf 8 is operated from a horizontal to a vertical position, and when swung from the vertical to the horizontal position, the bearing and slide blocks moving in an opposite direction to that just described.

In order to maintain the leaves 8 normally in vertical position, I provide means such as a weight 28 arranged to slide up and down at the rear of the elevator 6, a partition 29 being provided spaced from the rear wall 11 of the elevator to form a chamber for the weight. A suitable rope or cord 30 connects said weight 28, with the uppermost leaf 8, said cord running over guide rollers or pulleys 31 in the upper portion of the elevator, and being secured to the weight and leaf in any suitable manner.

32 indicates a stop carried by the bearing block for the uppermost leaf which is adapted to prevent rearward movement of the leaf under the influence of the weight 28 beyond the vertical position, thus serving as an abutment or back for the uppermost leaf when in operative position.

When it is desired to arrange the leaves 8 in compact form ready to be lowered in the casing, the spring catches 20 are released from the flanges 21 and the leaves are then moved into a horizontal position. Since the forward leaf is released from the elevator frame, and the rear leaf is connected to the weight 28, the gearing connections between the leaves will cause the leaves to move rearwardly, as they are moved into horizontal position, and such operation will result in positioning them in compact superposed relationship in the elevator ready for lowering.

In order to support the leaves at their front ends while in horizontal position, a cushion 33 may be provided on the base 17 as shown in Fig. 1.

The base 17 preferably comprises two members 34 and 35 pivotally connected together and to the blocks 19 by the studs 18. This form of construction permits the upper member 35, which may comprise a glass plate, to be swung upward independently of the other member. Metal plates or strips 36 bent over and extending along the front and opposite side edges of the glass plate, may be provided for protecting it. The frame 34 preferably constitutes an index carrying frame comprising an index carrying plate 37 slidably mounted in guides 38 arranged along its opposite sides.

39 indicates a hand rest or writing board, arranged forward of the leaves and preferably formed of sheet metal bent downward along its opposite sides, to form flanges 40. A pair of arms 41 extend rearwardly from the flanges 40, and are pivotally connected at their free ends to the sides of the base 17, whereby the hand rest may be folded back over the base when it is desired to lower the elevator into the cabinet. The portion of the metal between the arms 41, is doubled on itself to form a transverse support 42, which rests upon a forwardly projecting ridge of the base member 34 and thus supports the writing board in a plane coincident with the base member 35.

For the purpose of holding the leaves 8 in upright position, or the glass plate 35 in vertical position while changes in or additions to the index are being made, a lock is provided comprising a plate 43 pivoted to one of the flanges 21 of the elevator 6. The lock is also adapted to hold both members of the base in vertical position, if that is desirable, in order to close the index from the vision of persons not entitled to inspect it. The plate 43 is supported in operative position by means of a stop or pin 44, as shown in Fig. 7, said stop also being adapted to prevent the plate from moving into engagement with any of the leaves when not in use, as shown in Fig. 4.

To those skilled in the art of making filing appliances of the class described, many alterations in construction and widely differing embodiments and applications of my inventions, will suggest themselves, without departing from the spirit and scope thereof. My disclosures and description herein are purely illustrative and are not intended to be in any sense limiting.

I claim:

1. In a filing appliance, the combination of supporting means, a series of swingably mounted leaves one end leaf of which is pivotally mounted on said supporting means, sets of blocks, one set arranged at each side of the leaves, the blocks of each set slidable relative to each other and each alternate block forming a bearing for the pivot of the adjacent leaf, means between each bearing block and the adjoining blocks above and below it for causing relative movement between said blocks when the leaf carried by the bearing block is operated.

2. In a filing appliance, the combination of supporting means, a series of swingably mounted leaves one end leaf of which is pivotally mounted on said supporting means, sets of blocks, one set arranged at each side of the leaves, the blocks of each set slidable relative to each other and each alternate block forming a bearing for the pivot of the adjacent leaf, guides for supporting and guiding alternate blocks of each set, and means between each bearing block and the adjoining blocks above and below it for causing relative movement between said blocks when the leaf carried by the bearing block is operated.

3. In a filing appliance, the combination of a support, a series of leaves adapted to swing relatively to each other, a plurality of sets of blocks for connecting said leaves together, and inter-engaging means between the blocks of each set and operating, when one of the leaves is swung, to move the adjacent blocks relatively to each other.

4. In a filing appliance, the combination of supporting means, a series of swingably mounted leaves one end leaf of which is pivotally mounted on said supporting means, sets of blocks, one set arranged at each side of the leaves, the blocks of each set slidable relative to each other and each alternate block forming a bearing for the pivot of the adjacent leaf, and the remaining blocks being provided with racks on their upper and lower surfaces, and gears carried by the pivots of each leaf meshing with the racks of the adjacent blocks above and below them, and operating when a leaf is swung from one position to another to cause relative movement between the bearing blocks for the leaf and the adjacent blocks above and below them.

5. In a filing appliance, the combination of supporting means, a series of swingably mounted leaves one end leaf of which is pivotally mounted on said supporting means, sets of blocks, one set arranged at each side of the leaves, the blocks of each set slidable relative to each other and each alternate block forming a bearing for the pivot of the adjacent leaf, and the remaining blocks being provided with racks on their upper and lower surfaces, gears carried by the pivots of each leaf meshing with the racks of the adjacent blocks above and below them, and operating when a leaf is swung from one position to another to cause relative movement between the bearing blocks for the leaf and the adjacent blocks above and below them, and guide means for the bearing blocks.

6. In a filing appliance, the combination of a frame, a series of leaves slidably mounted in said frame, gearing between the leaves permitting them to swing relative to each other, and a base slidingly mounted in said frame and movable into an extended position to support the leaves when arranged horizontally, the said base comprising two members swingably mounted relative to each other.

7. In a filing appliance, the combination of a frame, a series of leaves slidably mounted in said frame, gearing between the leaves permitting them to swing relative to each other, and a base slidingly mounted in the frame and movable into an extended position to support the leaves when arranged horizontally, the said base comprising two members superposed one above the other and swingably mounted relative to each other.

8. In a filing appliance, the combination of a frame, a series of leaves, pivot blocks for the leaves slidably mounted in the frame and having gearing connections between them, means normally holding the pivot blocks for the foremost leaf forward in the frame, the pivot blocks for the remaining leaves being movable therein, and means tending to maintain the block for the rearmost leaf rearward in the frame, the holding means for the pivot block for the foremost leaf being releasable to permit the leaves to be moved rearward into compact relationship when in operative position.

GEORGE JACOBS.

Copies of this patent may be obtained for five cents each, by addressing the "Commissioner of Patents, Washington, D. C."